R. W. BOWEN.
Hemp Brake.
No. 15,166.
2 Sheets—Sheet 1.
Patented June 24, 1856.
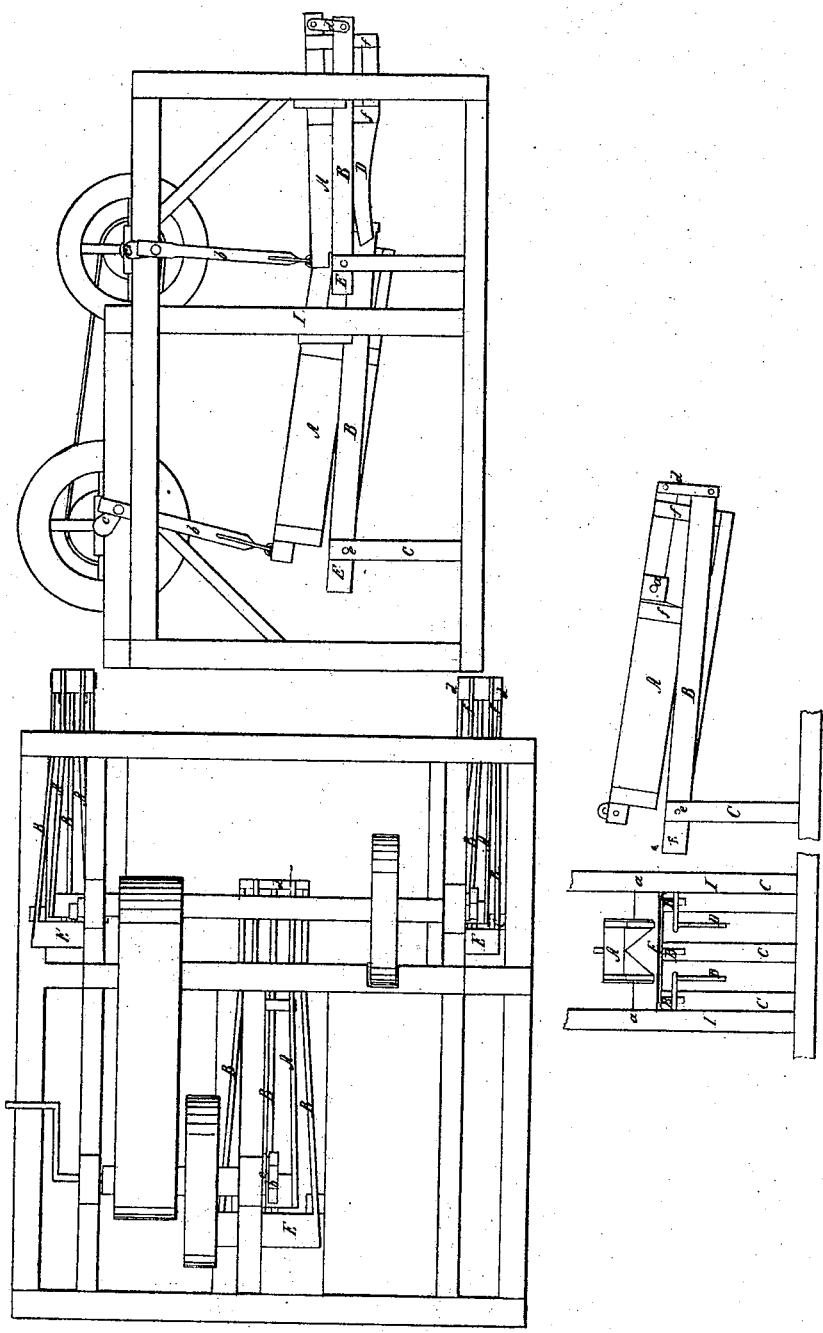

R. W. BOWEN.
Hemp Brake.
No. 15,166.
2 Sheets—Sheet 2.
Patented June 24, 1856.
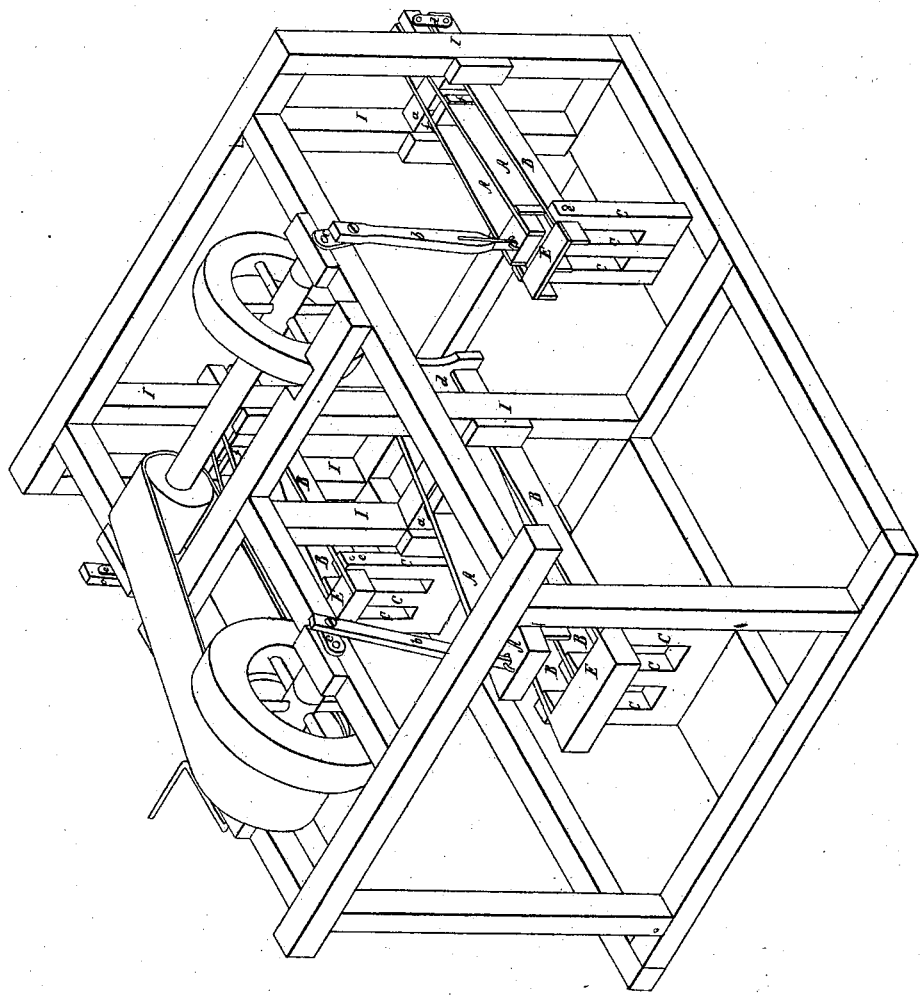

UNITED STATES PATENT OFFICE.

R. W. BOWEN, OF MARSHALL, MISSOURI.

IMPROVEMENT IN HEMP-BRAKES.

Specification forming part of Letters Patent No. 15,166, dated June 24, 1856.

*To all whom it may concern:*

Be it known that I, R. W. BOWEN, of Marshall, in the county of Saline and State of Missouri, have invented a new and useful Machine for Breaking and Cleaning Hemp; and I do hereby declare that the following is a full and exact description thereof, reference being made to the accompanying drawings and the letters of reference marked thereon.

The nature of my invention consists in constructing in a suitable frame one or more breakers with peculiar motion, through which hemp is passed in breaking with lifting-blades, and a table for receiving the hemp before breaking.

To enable others skilled in the art to make and use my invention, I will proceed to describe its construction and operation.

I construct the upper arm, A, of my breakers by having it turning around pivot-rollers $a\ a$, set in bearings in two upright posts, I I. The pivots being at a point at two-thirds of its length, or so about, measured from its fore end. The upper arm is set to motion by the pitman $b$, connected to crank $c$. The lower arm, B, of the breaker is jointed to the upper one by connecting-pieces $d\ d$, and turns around a pivot, $e$, in the smaller posts, C. The upper arm has two blades, the lower one three blades. By extending the blades of the lower arm, B, beyond the posts C C C a table, E, is formed to rest the hemp on.

By means of connecting-pieces $f f$ the lifting-blades D D are firmly attached to the upper blades, and more uniformly with them, and come up clear to top of lower blades when the breaker is opened.

I construct the machine of the following dimensions: the frame twelve feet by fourteen feet six inches on the ground plan, eight feet three inches high in front over large breakers, and seven feet seven inches high in the rear over two small breakers, measured from top of sill; the posts supporting the fore end of lower arms of breakers to be three feet high; the lower arm of large breaker to be eight feet nine inches long, including the projecting part, forming a table, which is nine inches wide; the clear space between the blades of the large breaker to be twelve inches at its fore end and diminishing to six inches at its turning-point between the two large upright posts, which are two feet six inches apart. The lower blades are to be seven inches wide, the upper blades to be fourteen inches in their fore part and seven inches in their hind part, and all the blades to be one and one-half inch thick. In my small breakers I make the lower arms six feet nine inches long, including the projecting table, which is six inches wide. The clear space between the blades is six inches in front and three inches in the rear at their turning-point. The lower blades are to be five and one-half inches wide, the upper blades to be eleven inches in their fore part and five and one-half inches in their hind part, and all blades one inch thick. The lifting-blades move perpendicular to upper blades; a seven-inch crank for the large breakers, and a five-inch crank for the small breakers.

By using the machine the breakers are set to motion by any motive power. The hemp is placed on the table in front of the breakers, and as soon as the breaker is opened the hemp is shoved in, and the breaking commenced at its middle, continued on to one end by drawing the hemp out endwise. The end of the hemp is then reversed and the operation repeated. From the large breaker the hemp is passed through the small breakers and sufficiently broken, and by each opening of the blades the hemp is raised and straightened by the lifting-blades.

What I claim as my invention, and desire to secure by Letters Patent, is—

The peculiar construction of the upper and lower blades of the brake, so that they shall approach each other at the same moment, but with different velocities, substantially in the manner described—that is to say, pivoting the lower blades at or near their front ends in a firm frame, and connecting their rear ends to the top blades, which are pivoted at a point about two-thirds of their length in a solid frame, and operated in front in any well-known manner—for the purposes above set forth.

R. W. BOWEN.

Witnesses:
O. P. KOENIG,
HERMAN KOENIG.